(12) United States Patent
Kuo (10) Patent No.: US 9,303,204 B2
(45) Date of Patent: Apr. 5, 2016

(54) PLANAR LIGHT SOURCE DEVICE AND METHOD OF MANUFACTURING SAME

(76) Inventor: Chin Piao Kuo, Hsinchu County (TW)

( * ) Notice: Subject to any disclaimer, the term of this patent is extended or adjusted under 35 U.S.C. 154(b) by 462 days.

(21) Appl. No.: 13/307,039

(22) Filed: Nov. 30, 2011

(65) Prior Publication Data

US 2013/0135896 A1    May 30, 2013

(51) Int. Cl.
*F21V 7/04* (2006.01)
*C09K 11/00* (2006.01)
*F21V 8/00* (2006.01)

(52) U.S. Cl.
CPC . *C09K 11/00* (2013.01); *F21V 7/04* (2013.01); *G02B 6/0021* (2013.01); *G02B 6/0065* (2013.01); *G02B 6/0073* (2013.01); *G02B 6/0091* (2013.01); *G02B 6/0038* (2013.01); *G02B 6/0046* (2013.01); *G02B 6/0055* (2013.01); *G02B 6/0061* (2013.01)

(58) Field of Classification Search
CPC .. G02B 6/0021; G02B 6/0011; G02B 6/0046; G02B 6/0036; G02B 6/0066; G02B 6/0068; G02B 6/0073; G02B 6/0091; B29D 11/00663; B29D 11/00721
USPC ......... 362/615, 619, 620, 626, 609, 612, 621, 362/606, 608; 264/1.29, 2.5, 1.24
See application file for complete search history.

(56) References Cited

U.S. PATENT DOCUMENTS

| | | | | |
|---|---|---|---|---|
| 5,375,043 A | * | 12/1994 | Tokunaga | 362/601 |
| 5,584,556 A | * | 12/1996 | Yokoyama et al. | 362/625 |
| 5,664,862 A | * | 9/1997 | Redmond et al. | 362/625 |
| 6,910,783 B2 | * | 6/2005 | Mezei et al. | 362/615 |
| 7,991,257 B1 | * | 8/2011 | Coleman | 385/129 |
| 2003/0117793 A1 | * | 6/2003 | Shin et al. | 362/31 |
| 2005/0219860 A1 | * | 10/2005 | Schexnaider | 362/601 |
| 2005/0243578 A1 | * | 11/2005 | Lee et al. | 362/617 |
| 2006/0158901 A1 | * | 7/2006 | Wang | 362/612 |
| 2007/0008739 A1 | * | 1/2007 | Kim et al. | 362/612 |
| 2007/0086209 A1 | * | 4/2007 | Hwang et al. | 362/620 |
| 2008/0089092 A1 | * | 4/2008 | Lee et al. | 362/612 |
| 2008/0159693 A1 | * | 7/2008 | Chang | 385/31 |
| 2010/0290253 A1 | * | 11/2010 | Tsai | 362/630 |
| 2011/0090713 A1 | * | 4/2011 | Chen et al. | 362/612 |

FOREIGN PATENT DOCUMENTS

DE    9105201 U1 *  7/1991

OTHER PUBLICATIONS

Eisenlohr, Joerg, No title available, Jul. 11, 1991, English translation.*

* cited by examiner

*Primary Examiner* — Ismael Negron
*Assistant Examiner* — James Endo
(74) *Attorney, Agent, or Firm* — IPR Works, LLC (57) ABSTRACT

A planar light source device includes a light guide plate, with its upper surface and lower surface as a first surface and a second surface. At least one light strip is provided with a plurality of light-emitting-diodes (LEDs), and is located on a side of the light guide plate. The LEDs are disposed in the light guide plate to emit light; and a reflective plate is disposed outside the second surface to reflect light a diffusion plate is disposed outside the first surface to scatter light reflected by the reflective plate. When manufacturing the light guide plate, the light-emitting-diodes (LEDs) are placed in a mold in advance, the LEDs and light guide plate form integrally, thereby avoiding loss of light, and raising the efficiency of the planar light source device.

10 Claims, 12 Drawing Sheets

PLANAR LIGHT SOURCE DEVICE AND METHOD OF MANUFACTURING SAME

BACKGROUND OF THE INVENTION

1. Field of the Invention

The present invention relates to a light source module, and in particular to a planar light source device and method of manufacturing the same.

2. The Prior Arts

Figure 1A:
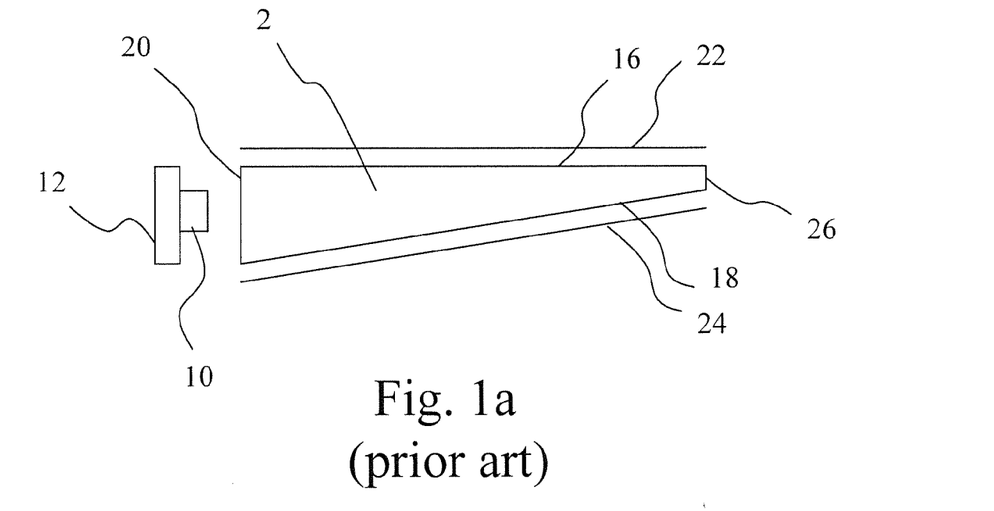
FIGS. 1a and 1b are a front view and a top view respectively of a side-type planar light source module utilizing a wedge-shape light guide plate according to the prior art.
Figure 1B:
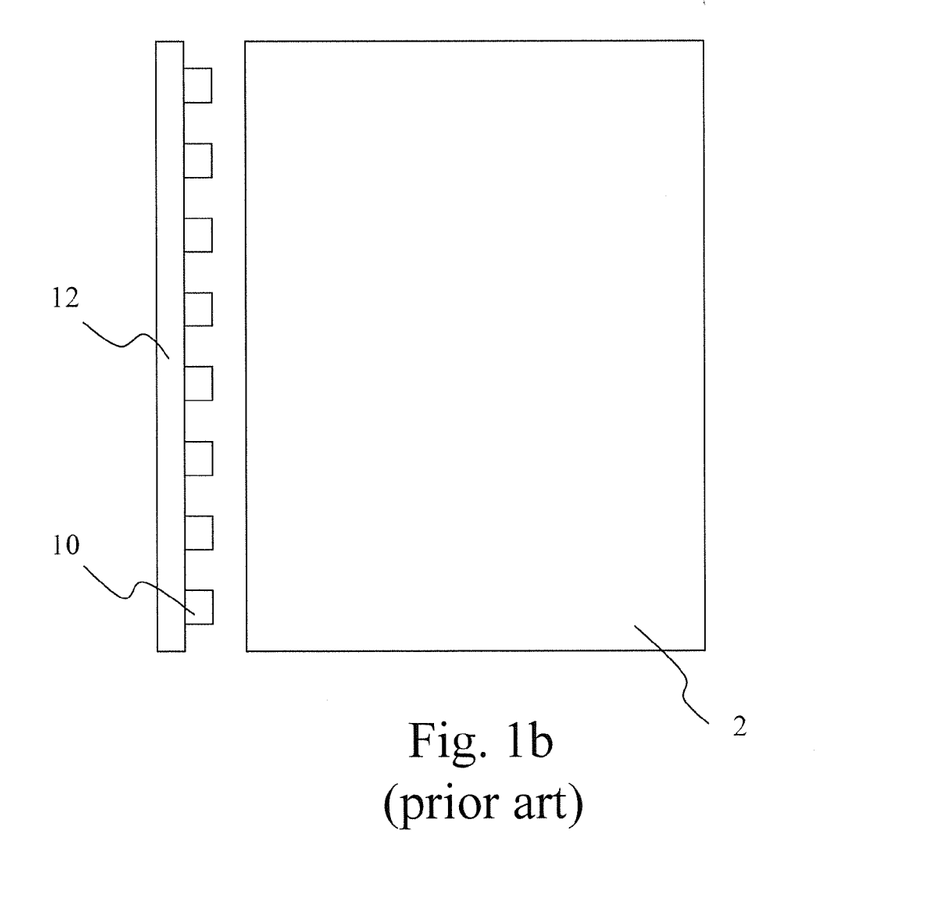

In general, a side-type planar light source module utilizing light-emitting-diode (LED) as its light source is made by installing a plurality of LEDs on a main-body substrate. Refer to FIGS. 1a and 1b respectively for a side view and a top view of an embodiment of a side-type planar light source module utilizing a wedge-shape light guide plate according to the prior art. Wherein, the side-type planar light source module includes a light guide plate 2 and a plurality of LEDs 10, the light guide plate usually is made by ejection-to-mold of acrylic, and above and below it are disposed respectively a diffusion plate 22 and a reflective plate 24. The main-body substrate is a light strip 12, and the LEDs are provided on a surface of the light strip 12, then the light emitting plane of the light strip 12 is aimed at a light incident plane 20 of the light guide plate 2, so that the light reflected by the reflective plate 24 is scattered by the diffusion plate 22, hereby realizing an uniform planar light source.

Figure 2A:
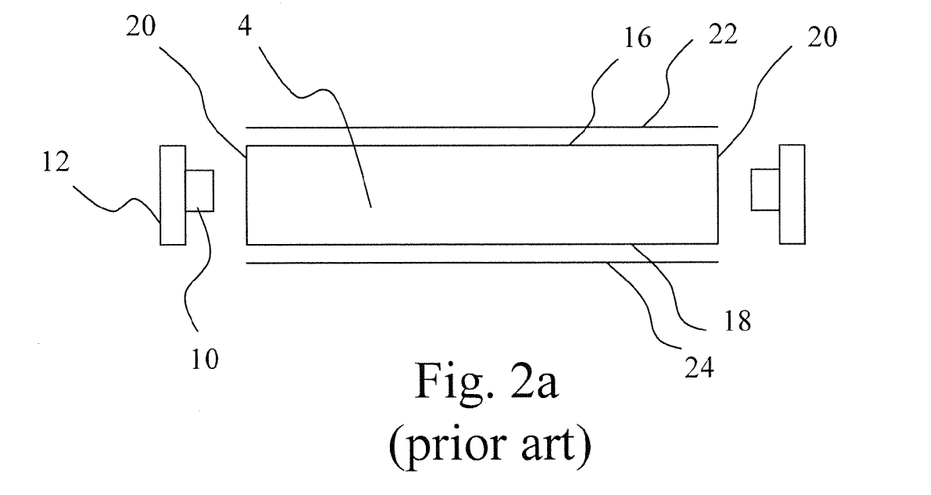
FIGS. 2a and 2b are a front view and a top view respectively of a light source module utilizing a planar light guide plate according to the prior art.
Figure 2B:
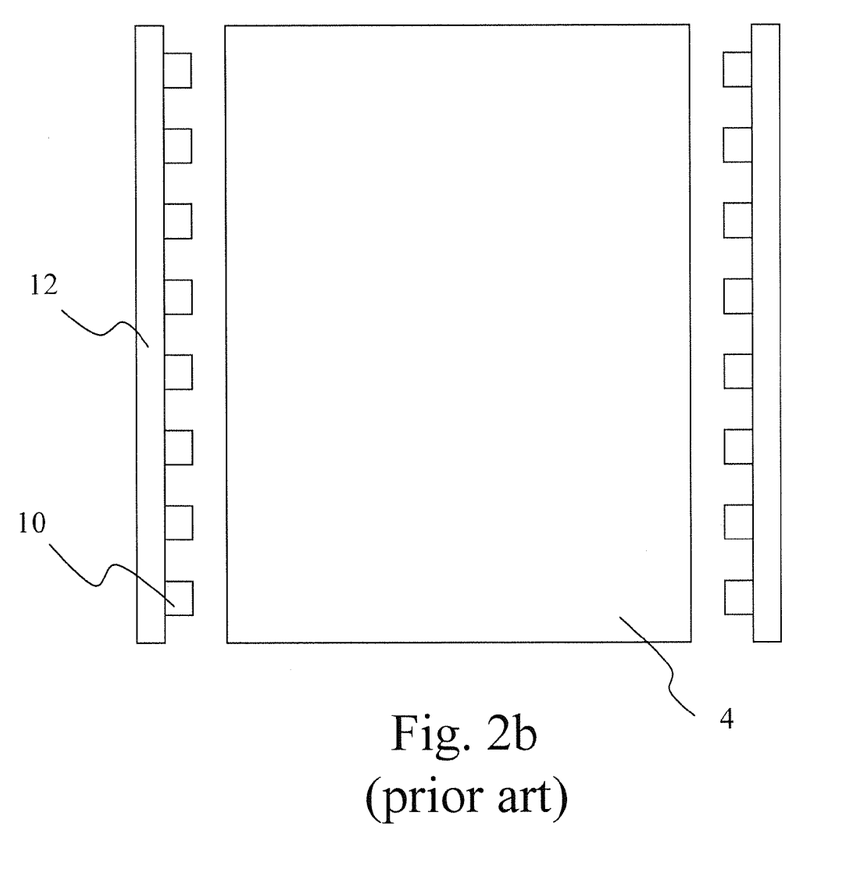

Then, refer to FIGS. 2a and 2b for a front view and top view respectively of another light source module according to the prior art. Wherein, a planar light guide plate 4 is utilized, and near its two opposing sides are provided with a light strip 12 and LEDs 10 respectively.

Figure 3A:
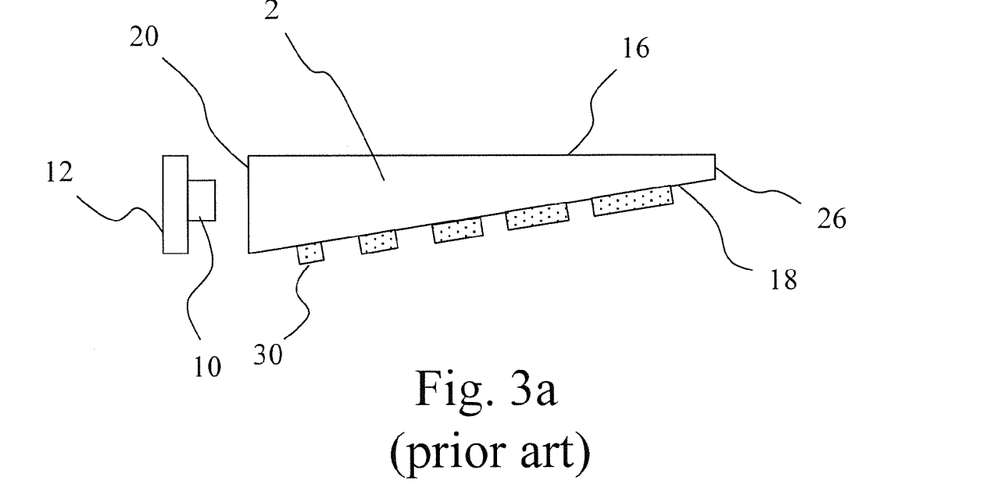
FIGS. 3a and 3b are a front view and a top view respectively of a light source module utilizing a wedge-shape light guide plate with an ink layer disposed thereon according to the prior art.
Figure 3B:
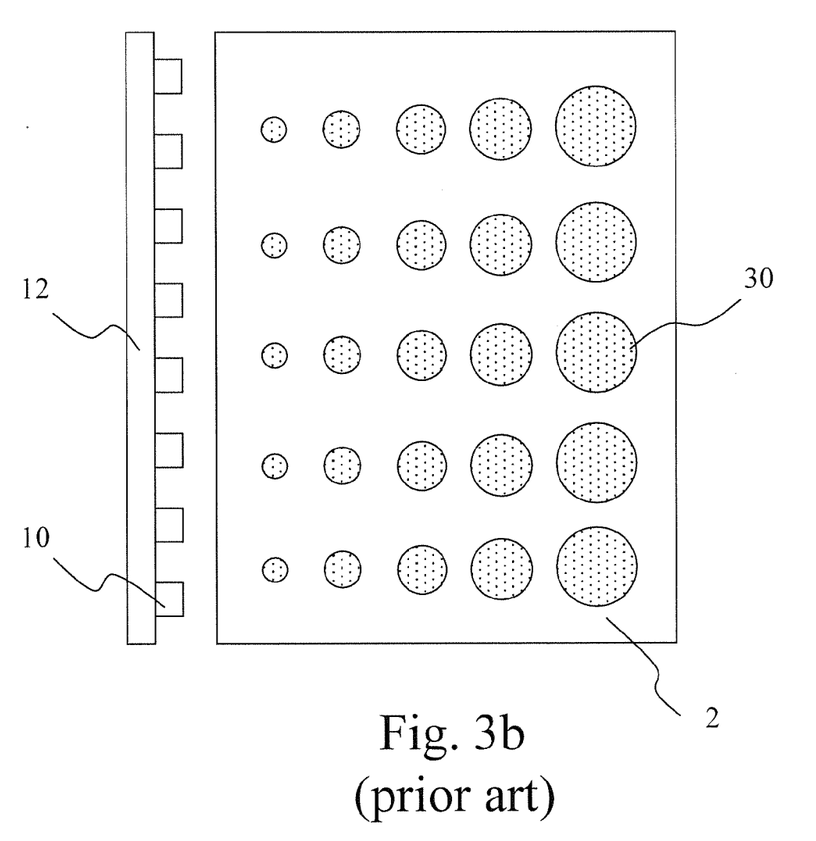
Figure 4A:
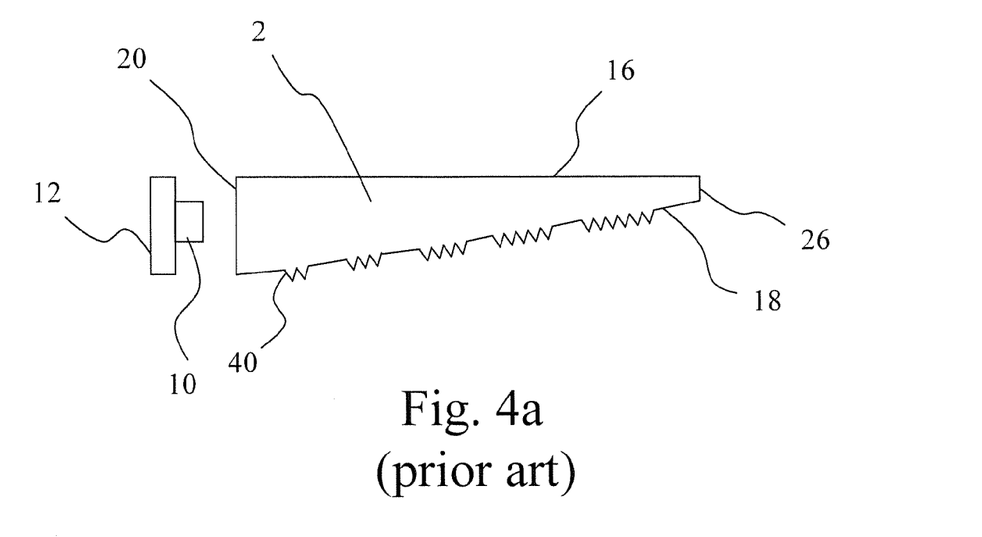
FIGS. 4a and 4b are a front view and a top view respectively of a light source module utilizing a wedge-shape light guide plate with roughened blocks disposed thereon according to the prior art.
Figure 4B:
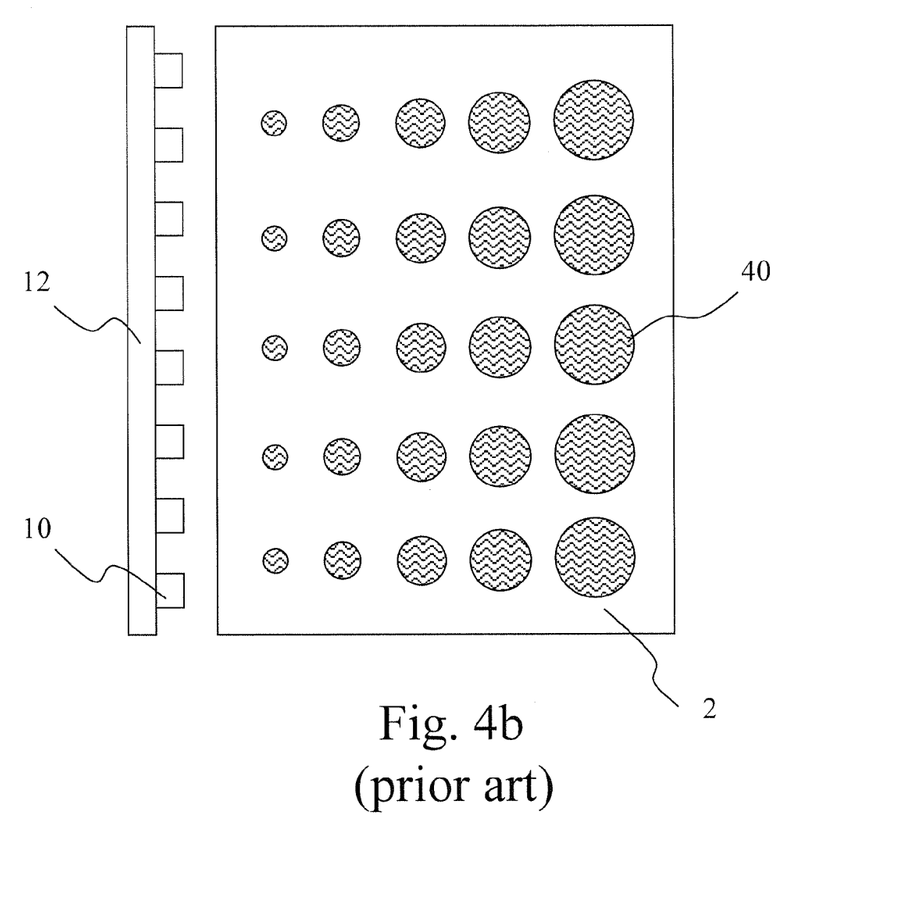
Figure 5A:
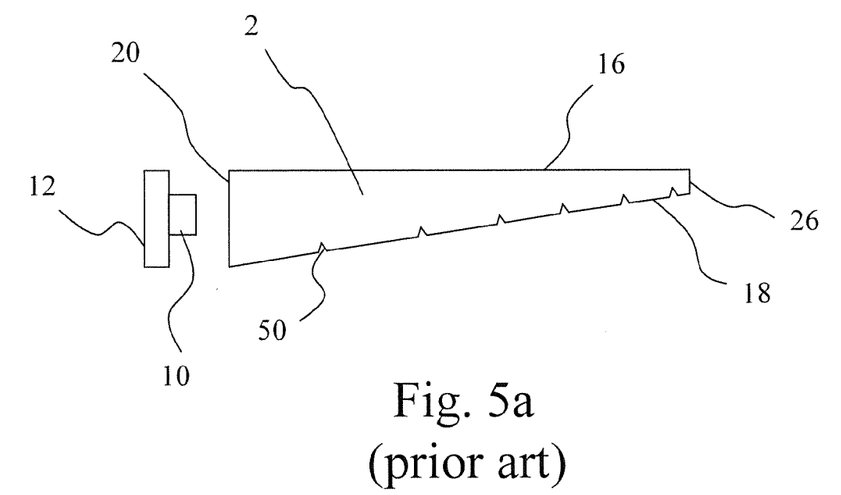
FIGS. 5a and 5b are a front view and a top view respectively of a light source module utilizing a wedge-shape light guide plate with indentions disposed thereon according to the prior art.
Figure 5B:
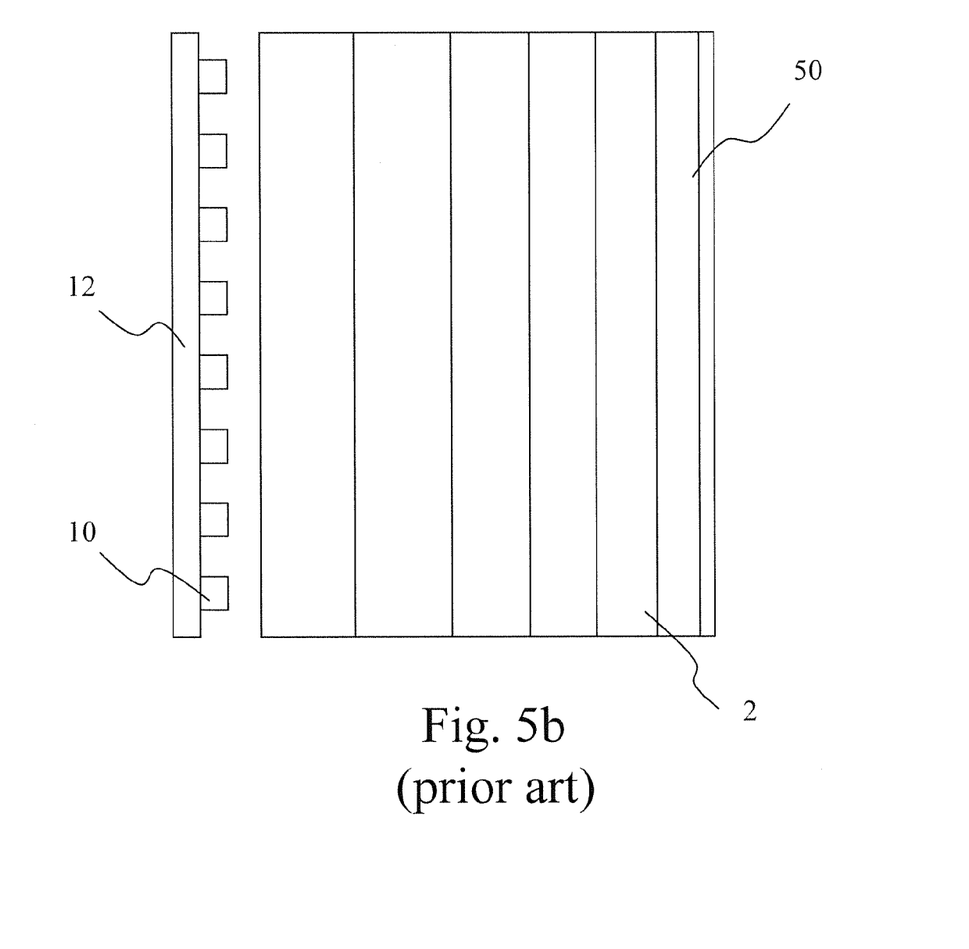

In order to obtain uniform illuminance for the light source module, in general, the surface of the light guide plate is printed with material having reflectivity different from that of the acrylic plate, or a reflection plane of a different angle, namely the reflective plate 24, is formed directly on the surface of the light guide plate, as shown in FIG. 1a. Also, refer to FIGS. 3a to 5b, which shows respectively the front views and top views of the embodiments of three kinds of side-type light source modules according to the prior art. In FIGS. 3a to 3b are shown an ink layer 30 containing light scattering particles and formed by transparent resin are formed on a second surface 18 of the light guide plate 2. In FIGS. 4a to 4b are shown a plurality of roughened blocks 40 formed on the second surface 18 of the light guide plate 2, so that its second surface 18 is a rough surface having indentions and protrusions. And in FIGS. 5a and 5b are shown, the second surface 18 of the light guide plate 2 is cut into a plurality of indentions 50, so that the second surface 18 is of a saw-tooth shape. The three embodiments mentioned above all utilize increased reflection area to achieve uniform light illuminance. Usually, the efficiency of a light source module is proportional to the thickness of the light incident plane 20 of the light guide plate, and evenness of the surface of the light incident plane 20, and frequently, in considering cost, weight, and thickness, efficiency has to be sacrificed to balance the factors mentioned above. Besides, the separation of the light source and light guide plate tends to cause loss of lights, thus reducing light illuminance.

Therefore, presently, the design and performance of a light source module is not quite satisfactory, and it has much room for improvements.

SUMMARY OF THE INVENTION

In view of the problems and drawbacks of the prior art, the present invention provides a planar light source device, so as to overcome the shortcomings of the prior art.

A major objective of the present invention is to provide a planar light source device, wherein, light-emitting-diodes (LEDs) and the light guide plate are formed integrally, so that light is able to enter completely into the light guide plate, to increase the efficiency of the planar light source device significantly.

Another objective of the present invention is to provide a planar light source device. Wherein, instead of only receiving radiation heat, the light guide plate dissipate directly the heat generated by LEDs, hereby reducing effectively the operation temperature of LED, raising its light emitting efficiency, and prolonging its service life.

A further objective of the present invention is to provide a method of manufacturing planar light source device, such that LEDs are put on a side of the mold, and composite material is poured into the mold to form polymerized light guide plate, so that the LEDs and the light guide plate are formed integrally.

In order to achieve the objective mentioned above, the present invention provides a planar light source device, comprising: a light guide plate, at least a light strip, a reflective plate, and a diffusion plate; the upper and lower surfaces of the light guide plate are the first surface and the second surface respectively; the light strip is disposed on at least one of two sides of the light guide plate, and a plurality of LEDs are provided on the light strip, so that the LEDs are in the light guide plate to emit light; and the reflective plate is placed outside the second surface to reflect light, and the diffusion plate is disposed outside the first surface, to diffuse and scatter the light reflected by the reflected plate to become a uniform and planar light source.

The present invention further provides a method of manufacturing a light guide plate in the planar light source device, comprising the following steps: install a plurality of LEDs on at least a light strip, and place the light strip on a side of an upper mold and a lower mold; mix a plurality of materials into a composite material, which includes methyl methacrylate (MMA) and polymerization initiator, and polymerize the composite material to make it into slurry; combine the upper mold and the lower mold into an integrated mold, and pour the slurried composite material into the mold, to make the composite material polymerized in the mold through a heating process; and finally perform de-molding of the mold to form a light guide plate.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

Figure 6A:
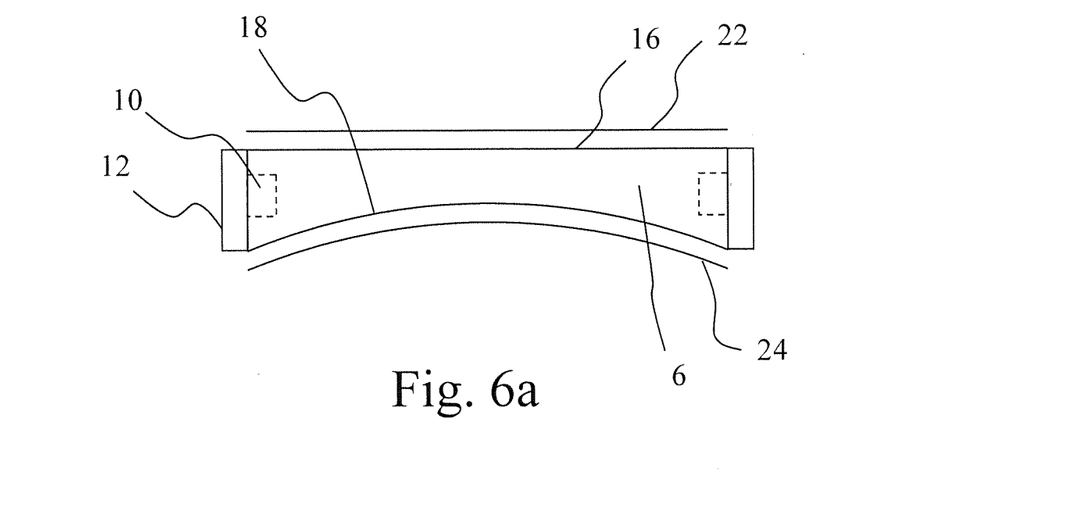
FIGS. 6a and 6b are a front view and a top view respectively of a light source module utilizing an indent-shape light guide plate having LEDs disposed therein for a planar light source device according to an embodiment of the present invention.
Figure 6B:
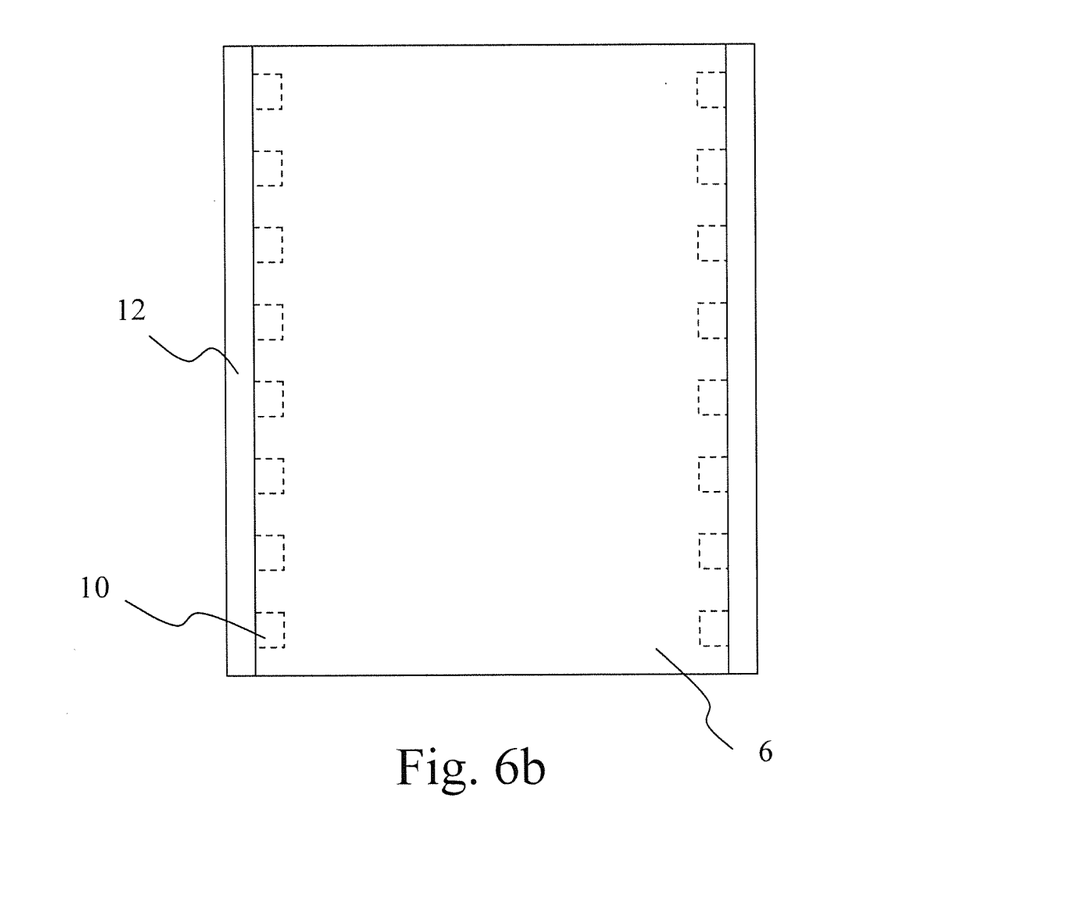

The present invention provides a planar light source device and a method of manufacturing the same, wherein, LEDs are placed in the light guide plate. Refer to FIGS. 6a and 6b for a front view and a top view respectively of a planar light source device according to an embodiment of the present invention. As shown in FIGS. 6a and 6b, the planar light source device includes: an indent-shape light guide plate 6, at least a light strip 12, a reflective plate 24, and a diffusion plate 22. The indent-shape light guide plate 6 can be a transparent acrylic plate, with its upper and lower surfaces as the first surface 16 and the second surface 18, the diffusion plate 22 is disposed outside the first surface 16, and the reflective plate 24 is disposed outside the second surface 18; the light strips 12 are disposed on two sides of the indent-shape light guide plate 6, and with a plurality of LEDs 10 disposed thereon, such that the LEDs 10 are inside the indent-shape light guide plate 6 to emit lights; and the reflective plate 24 reflects the light coming from the LEDs, then the diffusion plate 22 diffuse and scatter the light reflected by the reflective plate 24 to become a uniform and planar light source.

In the embodiment as shown in FIGS. 6a and 6b, the light guide plate is of an indent-shape, and the second surface 18 is a curved or an arc surface curving toward to the first surface 16, while the degree of curvature the reflective plate 24 is the same as that of the second surface 18.

Figure 7A:
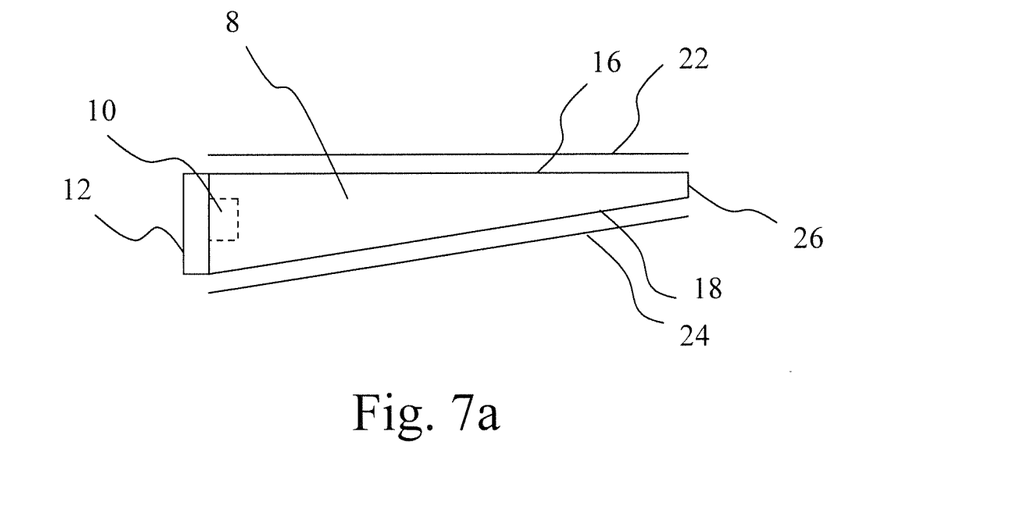
FIGS. 7a and 7b are a front view and a top view respectively of a light source module utilizing a wedge-shape light guide plate having LEDs disposed therein for a planar light source device according to an embodiment of the present invention.
Figure 7B:
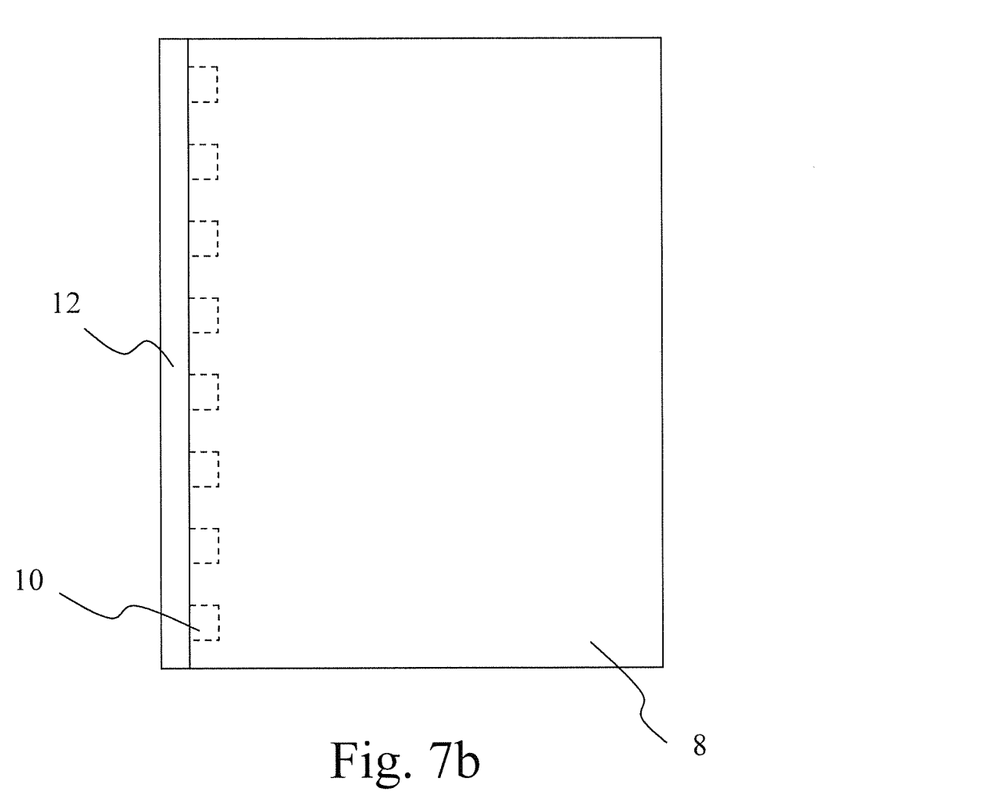

Then, refer to FIGS. 7a and 7b for a front view and a top view respectively of a light source module utilizing a wedge-shape light guide plate having LEDs disposed therein for a planar light source device according to an embodiment of the present invention. The differences between FIGS. 7a and 7b and FIGS. 6a and 6b is that, the light guide plate 8 is of a wedge-shape, and only a light strip 12 is provided, with the end of the wedge-shape light guide plate 8 having light strip 12 being wider, and with an edge 26 at its end having no light strip 12 being narrower. Light-emitting-diodes 10 are similarly placed inside the wedge-shape light guide plate 8, such that light emitted by the LEDs 10 is reflected by the reflective plate 24 to the first surface 16, then light is scattered out through the diffusion plate 22.

Figure 8A:
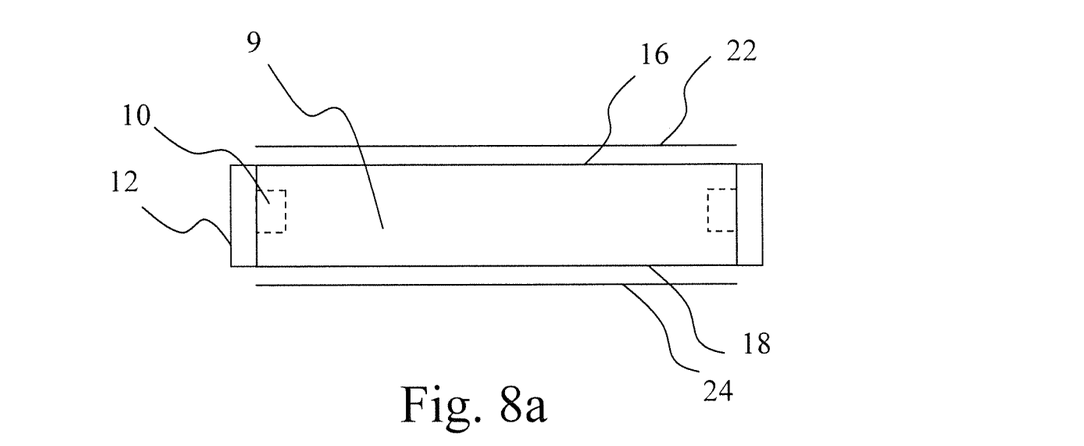
FIGS. 8a and 8b are a front view and a top view respectively of a light source module utilizing a planar light guide plate having LEDs disposed therein for a planar light source device according to an embodiment of the present invention.
Figure 8B:
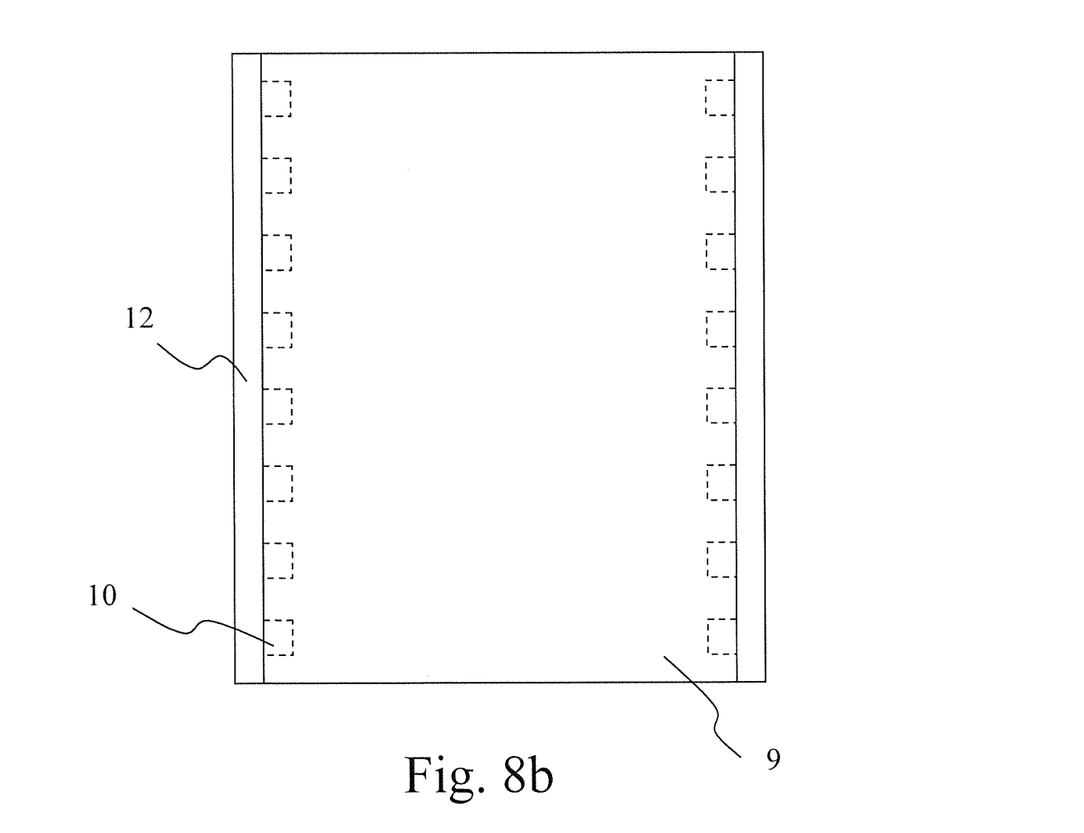

Subsequently, refer to FIGS. 8a and 8b for a front view and a top view respectively of a light source module utilizing a planar light guide plate having LEDs disposed therein for a planar light source device according to an embodiment of the present invention. The differences between FIGS. 8a and 8b and FIGS. 6a and 6b is that, the light guide plate is a planar light guide plate 9, the first surface 16 and the second surface 18 are parallel to each other, so that on both sides of planar light guide plate 9 are provided with a light strip 12 having LEDs 10 disposed thereon. Similarly, LEDs 10 are placed in the planar light guide plate 9, so that light emitted by the LEDs 10 is reflected by the reflective plate 24 to the first surface 16, then light is scattered out through the diffusion plate 22.

Figure 9A:
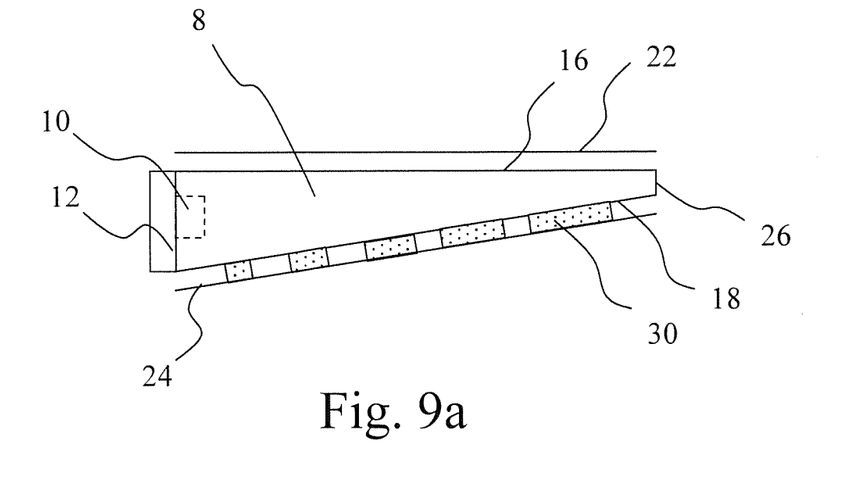
FIGS. 9a and 9b are a front view and a top view respectively of a light source module utilizing a light guide plate having LEDs disposed therein and is provided with an ink layer for a planar light source device according to an embodiment of the present invention.
Figure 9B:
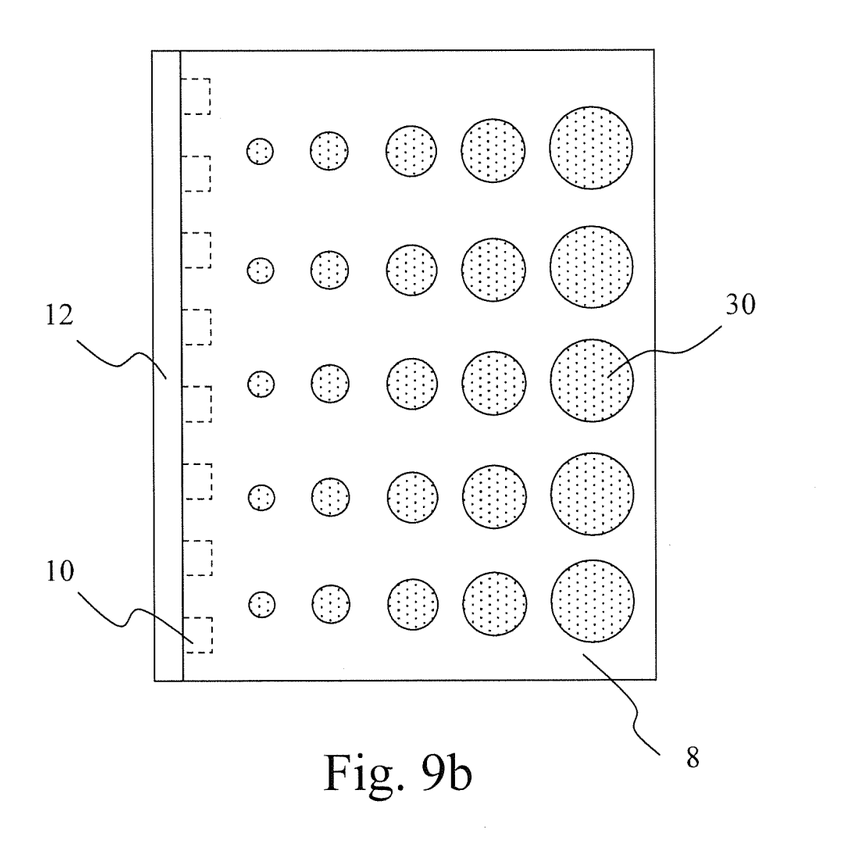
Figure 10A:
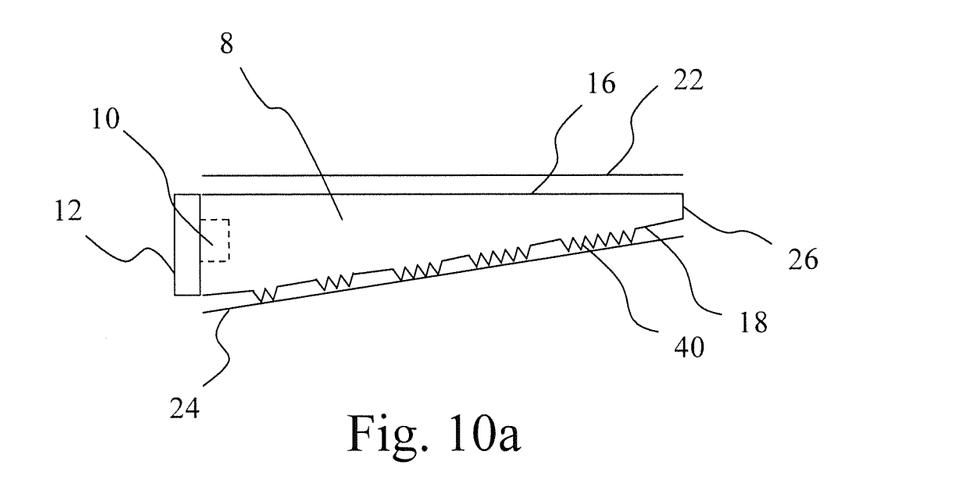
FIGS. 10a and 10b are a front view and a top view respectively of a light source module utilizing a light guide plate having LEDs disposed therein and is provided with roughened blocks for a planar light source device according to an embodiment of the present invention.
Figure 10B:
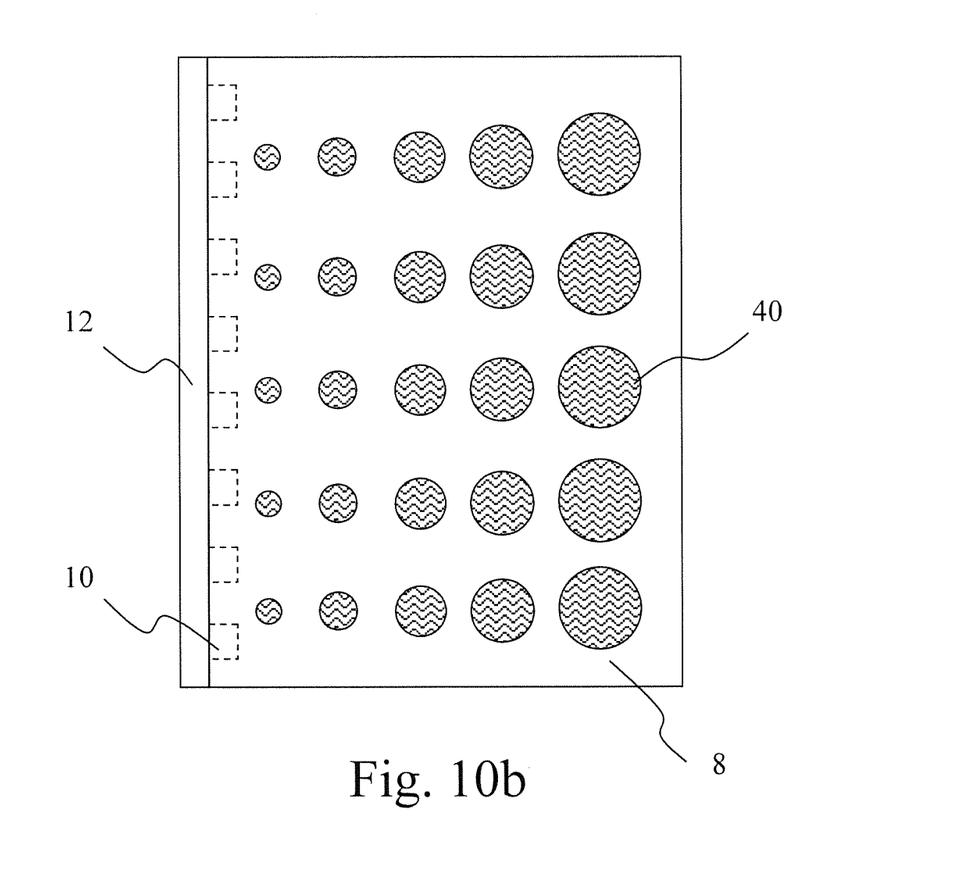
Figure 11A:
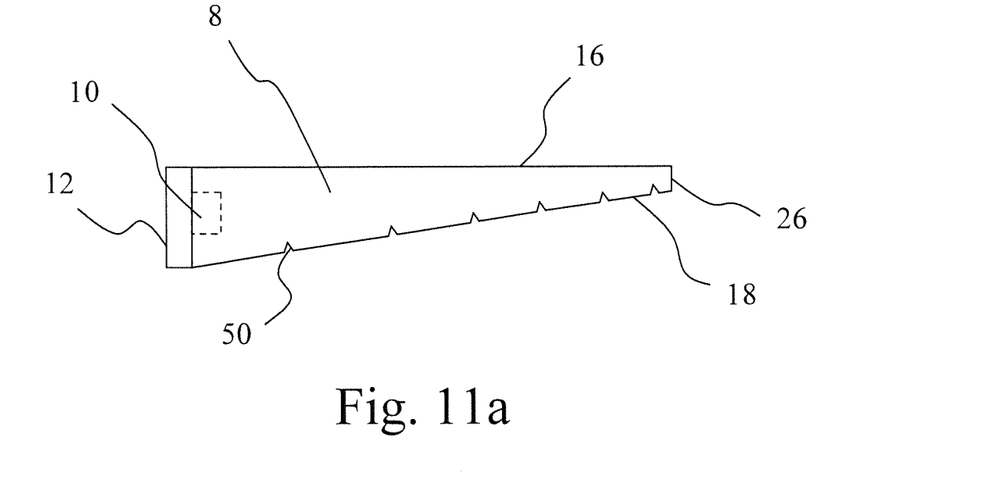
FIGS. 11a and 11b are a front view and a top view respectively of a light source module utilizing a light guide plate having LEDs disposed therein and is provided with indentions for a planar light source device according to an embodiment of the present invention.
Figure 11B:
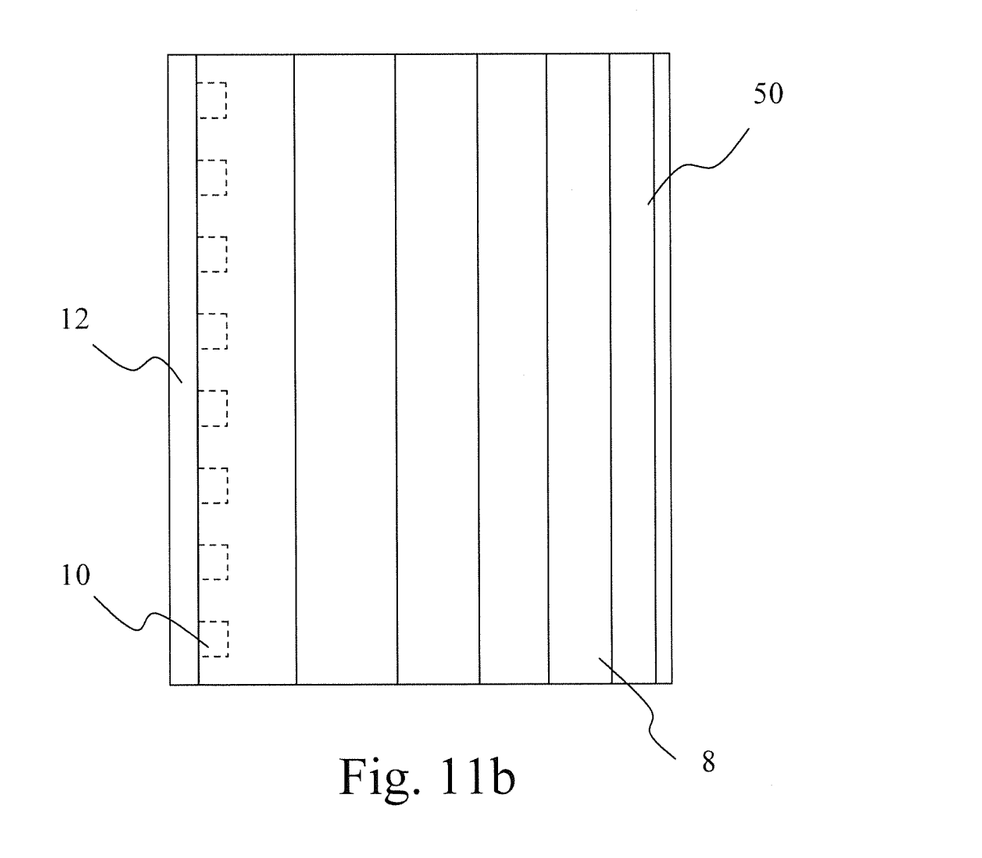

Then, refer to FIGS. 9a and 10a and 11a for front views respectively for the other three embodiments of planar light source device according to the present invention, wherein, increased reflection area is designed on the second surface of light guide plate, so that the light emitted is more uniform and of higher illuminance. Refer to FIGS. 9a and 9b, in this embodiment, a wedge-shape light guide plate is taken as an example for explanation. Wherein, on the second surface 18 of the wedge-shape light guide plate 8 is provided with a plurality blocks having ink layers 30 made of transparent resin and containing light scattering particles, which make the light transmitted through more uniform. Similarly, in FIGS. 10a and 10b, a wedge-shape light guide plate is taken as an example for explanation. Wherein, on the second surface 18 of the wedge-shape light guide plate 8 is provided with a plurality roughened blocks 40, or rough surfaces are formed directly on the second surface 18, so that the second surface 18 is indented to have indentions and protrusions to increase the reflection area. Finally, in FIGS. 11a and 11b, a wedge-shape light guide plate is also taken as an example for explanation. Wherein, the second surface 18 of the wedge-shape light guide plate 8 is cut into a plurality of indentions 50, so that the second surface 18 is of a saw-tooth shape, to increase reflection area and improve uniformity of the transmitted light, thus achieving sufficient illuminance through light scattering.

The planar light source device of the present invention can itself be used as planar light source for illumination purpose, or it can be used as backlight module of a liquid crystal display (LCD).

Figure 12:
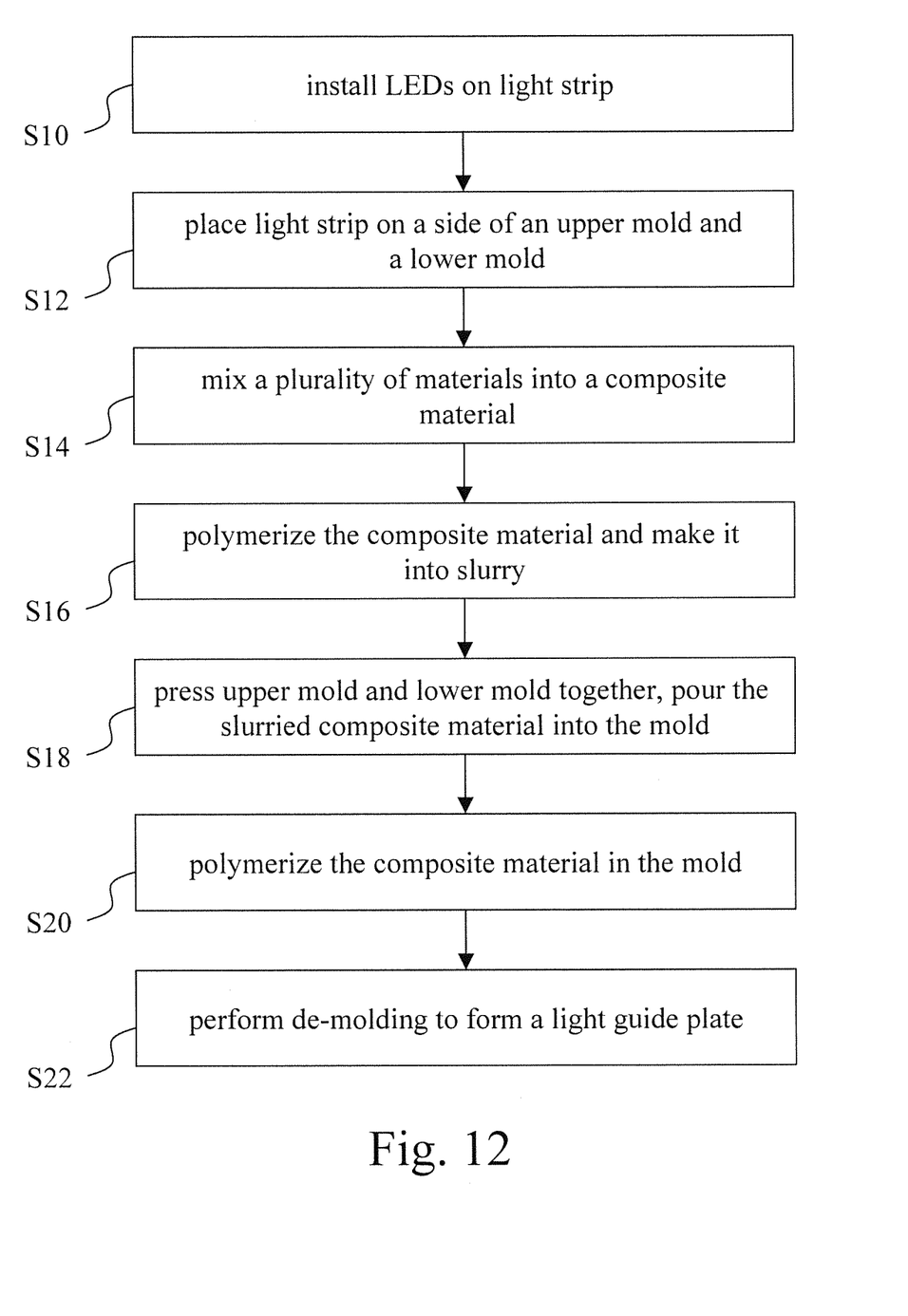
FIG. 12 is a flowchart of the steps of a method of manufacturing a planar light source device according to an embodiment of the present invention.

Finally, refer to FIG. 12 for a flowchart of the steps of a method of manufacturing a planar light source device according to the present invention. As shown in FIG. 12, firstly, as shown in step S10, install a plurality of LEDs onto at least a light strip; next, as shown in step S12, place the light strip on a side of an upper mold and a lower mold, such that the number of light strips placed is depending on the shape of mold of the light guide plate, for example, for a wedge-shape light guide plate only one light strip is placed, however for an indented or planar light guide plate, two light strips can be provided; then, as shown in step S14, mix a plurality of materials into a composite material, which includes methyl methacrylate (MMA) and polymerization initiator; then as shown in step S16, prepare the composite material for polymerization, to make the mixed monomer to start initial polymerization, then apply a heating process to make the composite material into slurry; subsequently, as shown in step S18, combine an upper mold and a lower mold into an integral mold, to pour the slurried composite material into the mold; then, as shown in step S20, apply a heating process to polymerize the composite material in the mold, this heating process is required to raise the speed and effect of polymerization; and finally, as shown in step S22, perform de-molding of mold to form a light guide plate integrally with LEDs.

In the present invention, a pour-in and polymerization method is used, so that liquid methyl methacrylate (MMA) is polymerized slowly into solid acrylic (PMMA) in several hours. In this process, the operation temperature is kept below 100° C., and the pressure inside the molds is rather low, so that light strip with a plurality of LEDs installed can be placed in advance between an upper and a lower molds, to form a light guide plate integrally with the LEDs according to the process of FIG. 12.

Summing up the above, the present invention provides a planar light source device and method of manufacturing the same. Wherein, in the manufacturing process, light-emitting-diodes are placed in the molds in advance, to produce a light guide plate integrally with the LEDs, so that lights are able to enter completely into the light guide plate, to increase efficiency of the planar light source device significantly. In addition, since the light guide plate is formed integrally with LEDs, therefore, heat generated by LEDs can be dissipated through the light guide plate, rather than in the prior art that, the light guide plate is separated from the LEDs, thus it can only receive radiation heat of LEDs. Compared with the prior art, the present invention could achieve better heat dissipation through using the same heat dissipation technique, hereby reducing effectively operation temperature of LEDs, raising its light emitting efficiency, and prolonging its service life.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A planar light source device, comprising:
   a light guide plate having an upper surface as a first surface and a lower surface as a second surface and made of solid polymethyl-methacrylate (PMMA);
   at least one light strip having a plurality of light-emitting-diodes (LEDs) thereon, said light strip being located on a side of said light guide plate extending between said first and second surfaces, and said LEDs being disposed in embedded contact with said light guide plate to emit light therethrough;
   a reflective plate disposed outside said second surface to reflect light; and
   a diffusion plate disposed outside said first surface to scatter light reflected by said reflective plate,
   wherein the light guide plate is manufactured by a method including a pour-in and polymerization step and not manufactured by an injection method, and
   wherein methyl methacrylate (MMA) and polymerization initiator are mixed to form a slurry and then said slurry is not injected but poured into a mold to make said slurry be polymerized into said solid PMMA being not melted in said mold, so that said LEDs and said light guide plate are formed integrally.

2. The planar light source device as claimed in claim 1, wherein said light guide plate is of an indent-shape, with its first surface as a planar surface, said light strips are disposed on both sides of said light guide plate, and said second surface is a curved surface or an arc surface curving toward said first surface.

3. The planar light source device as claimed in claim 2, wherein said reflective plate and second surface are of a same curved or arc surface.

4. The planar light source device as claimed in claim 1, wherein said light guide plate is of a wedge-shape, with its side having said light strip wider than its side farther away from said light strip.

5. The planar light source device as claimed in claim 1, wherein said first surface and said second surface are parallel to each other, and at least one side is provided with said light strip.

6. The planar light source device as claimed in claim 1, wherein on said second surface is further provided with a plurality of blocks having ink layers containing light scattering particles.

7. The planar light source device as claimed in claim 1, wherein on said second surface is further provided with a plurality of roughened blocks.

8. The planar light source device as claimed in claim 1, wherein on said second surface is further provided with a plurality of indentions to make said second surface as a saw-tooth shape.

9. The planar light source device as claimed in claim 1, wherein said light guide plate is a transparent acrylic plate.

10. The planar light source device as claimed in claim 1, wherein said slurry is polymerized into said solid PMMA under a temperature kept below 100° C. in said mold.

* * * * *